US011670073B2

United States Patent
Alatwah

(10) Patent No.: US 11,670,073 B2
(45) Date of Patent: Jun. 6, 2023

(54) SYSTEM AND METHOD FOR DETECTION OF CARBONATE CORE FEATURES FROM CORE IMAGES

(71) Applicant: Saudi Arabian Oil Company, Dhahran (SA)

(72) Inventor: Saleh Z. Alatwah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 345 days.

(21) Appl. No.: 17/001,932

(22) Filed: Aug. 25, 2020

(65) Prior Publication Data

US 2022/0067420 A1 Mar. 3, 2022

(51) Int. Cl.
| | | |
|---|---|---|
| *G06V 10/50* | (2022.01) | |
| *G06N 3/04* | (2023.01) | |
| *G06N 3/08* | (2023.01) | |
| *G06F 18/40* | (2023.01) | |
| *G06F 18/21* | (2023.01) | |
| *E21B 49/02* | (2006.01) | |

(52) U.S. Cl.
CPC .......... *G06V 10/50* (2022.01); *G06F 18/2163* (2023.01); *G06F 18/40* (2023.01); *G06N 3/04* (2013.01); *G06N 3/08* (2013.01); *E21B 49/02* (2013.01); *E21B 2200/20* (2020.05)

(58) Field of Classification Search
CPC .... G06V 10/50; G06K 9/6253; G06K 9/6261; G06N 3/04; G06N 3/08
See application file for complete search history.

(56) References Cited

U.S. PATENT DOCUMENTS

| | | | |
|---|---|---|---|
| 9,418,316 B1* | 8/2016 | Liu | G06V 20/63 |
| 10,410,092 B1* | 9/2019 | Chen | G06V 10/40 |
| 2013/0080133 A1 | 3/2013 | Sung et al. | |
| 2016/0171707 A1* | 6/2016 | Schwartz | G06T 7/90 |
| | | | 382/180 |
| 2018/0075603 A1* | 3/2018 | Hougen | G06T 7/11 |

(Continued)

FOREIGN PATENT DOCUMENTS

| | | | | |
|---|---|---|---|---|
| WO | WO-2014075174 A1 * | 5/2014 | ......... | G06K 9/00154 |
| WO | 2018106748 A1 | 6/2018 | | |
| WO | 2019055565 A1 | 3/2019 | | |

OTHER PUBLICATIONS

International Search Report and Written Opinion for International Application No. PCT/US2021/047383, report dated Jan. 4, 2022; pp. 1-16.

(Continued)

*Primary Examiner* — Qun Shen
(74) *Attorney, Agent, or Firm* — Bracewell LLP; Constance G. Rhebergen; Keith R. Derrington

(57) ABSTRACT

A method and system is provided for detection of carbonate core features from core images. An input carbonate core image is separated into a plurality of first blocks, each of the plurality of first blocks having a first block size. An image of each of the separated plurality of first blocks is input into an artificial intelligence (AI) model. The AI model being trained to predict for each first block, one of a plurality of carbonate core features and a corresponding confidence value indicating a confidence of the predicted carbonate core feature being imaged in the first block. Any bounding boxes of a first set of bounding boxes are detected in the input core image based on the predicted one of the plurality of carbonate core features and the corresponding confidence values for each first block.

20 Claims, 6 Drawing Sheets

(56) References Cited

U.S. PATENT DOCUMENTS

| | | |
|---|---|---|
| 2019/0064378 A1 | 2/2019 | Liu et al. |
| 2019/0087939 A1 | 3/2019 | Hakimuddin et al. |
| 2019/0294641 A1* | 9/2019 | Alexeev .............. G06F 16/951 |
| 2020/0004815 A1* | 1/2020 | Weisberg .............. G06V 10/82 |
| 2020/0065620 A1 | 2/2020 | Feng et al. |
| 2020/0132875 A1 | 4/2020 | Zhang et al. |
| 2020/0183035 A1 | 6/2020 | Liu et al. |
| 2022/0012466 A1* | 1/2022 | Taghavi .................... G06T 3/60 |

OTHER PUBLICATIONS

Baraboshkin et al., "Deep Convolutions for In-Depth Automated Rock Typing", Sep. 27, 2019, 24 pages.

Karimpouli et al., "Segmentation of Digital Rock Images Using Deep Convolutional Autoencoder Networks", Computers & Geosciences 126, pp. 142-150, dated 2019.

Ledieu, "Classifying Reservoir Rock Quality from Thin Sections of Core Using Convolutional Neural Networks", KTH Royal Institute of Technology School of Electrical Engineering & Computer Science, pp. 1-87, dated Mar. 2019.

Padarian et al., "Using Deep Learning for Digital Soil Mapping", Soil, 2019, pp. 79-89.

Pires de Lima et al., "Convolutional Neural Networks as Aid in Core Lithofacies Classification", Interpretation 7: SF27-SF40, 2019.

Valentin et al., "A deep Residual Convolutional Neural Network for Automatic Lithological Facies Identification in Brazilian Pre-salt Oilfield Wellbore Image Logs", Journal of Science & Engineering 179, pp. 474-503, Aug. 2019.

* cited by examiner

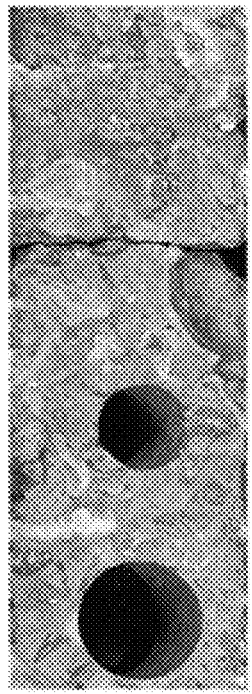 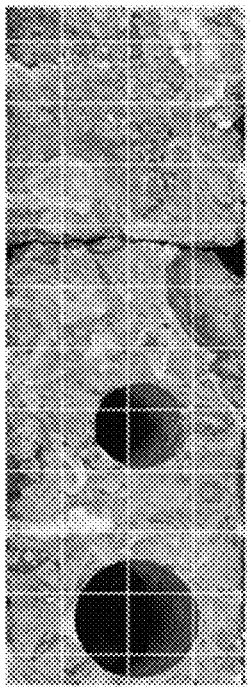 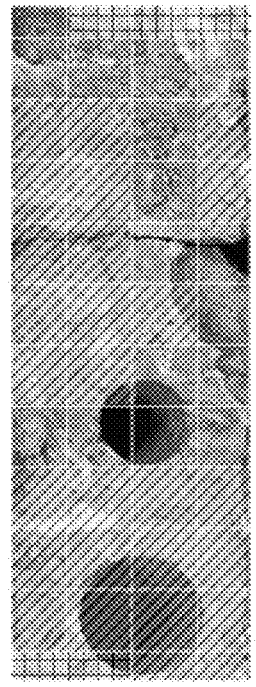 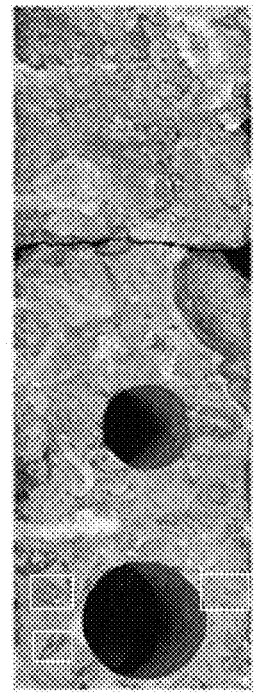
FIG. 5A  FIG. 5B  FIG. 5C  FIG. 5D
RED 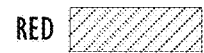   GREEN 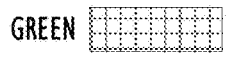   CLUSTER 
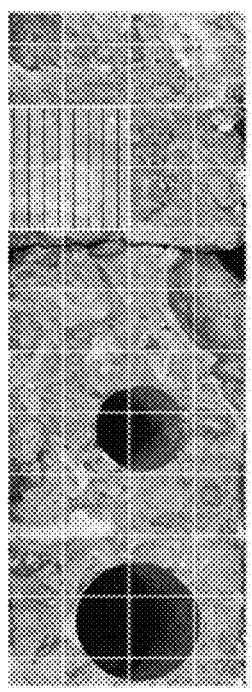 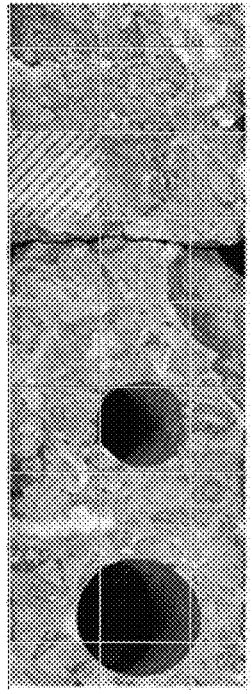 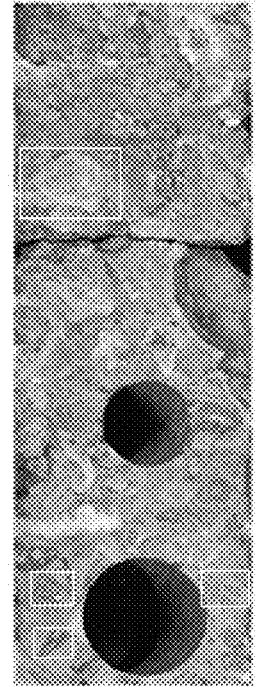 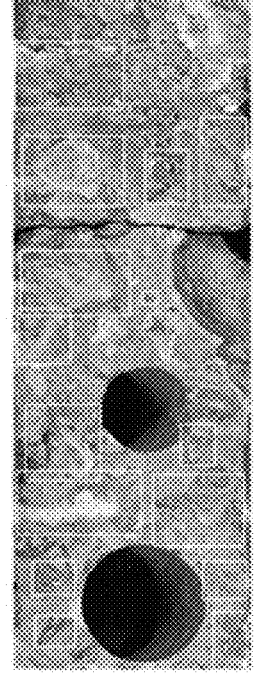
FIG. 5E  FIG. 5F  FIG. 5G  FIG. 5H

SYSTEM AND METHOD FOR DETECTION OF CARBONATE CORE FEATURES FROM CORE IMAGES

TECHNICAL FIELD

Embodiments of the invention generally relate to reservoir characterization, and more particularly to automatic identification and description of carbonate cores from core images based on an artificial intelligence (AI) based model.

BACKGROUND

A rock formation that resides under the Earth's surface is often referred to as a "subsurface" formation. A subsurface formation that contains a subsurface pool of hydrocarbons, such as oil and gas, is often referred to as a "hydrocarbon reservoir." Hydrocarbons are typically extracted (or "produced") from a hydrocarbon reservoir by way of a hydrocarbon well. A hydrocarbon well normally includes a wellbore (or "borehole") that is drilled into the reservoir. For example, a hydrocarbon well may include a wellbore that extends into the rock of a reservoir to facilitate the extraction (or "production") of hydrocarbons from the reservoir, the injection of fluids into the reservoir, or the evaluation and monitoring of the reservoir.

Development of a hydrocarbon reservoir typically involves multiple phases and operations directed to optimizing extraction of the hydrocarbons from the reservoir. For example, a reservoir operator may spend a great deal of time and effort assessing a hydrocarbon reservoir to identify an economical and environmentally responsible plan to extract hydrocarbons from the reservoir, and may engage in corresponding well drilling and production operations to extract hydrocarbons from the reservoir in accordance with the plan. This can include identifying where hydrocarbons are located in the reservoir and generating a field development plan (FDP) that outlines procedures for extracting hydrocarbons from the reservoir, and drilling and operating one or more wells in accordance with the procedures outlined in the FDP. An FDP for a hydrocarbon reservoir may, for example, specify locations, trajectories and operational parameters of production wells, injection wells and monitoring wells that extend into the reservoir.

In many instances, operators rely on reservoir models and simulations to characterize a hydrocarbon reservoir, and generate or update the FDPs for the reservoir over the course of the development of the reservoir. First, a model may be built based on reservoir characteristics with respect to fluid flow. The model characterizing a reservoir may be built such that it incorporates all the characteristics of the reservoir that are pertinent to its ability to store hydrocarbons and also to produce them. The reservoir characterization model may then be used to simulate the behavior of the fluids within the reservoir under different sets of circumstances and to find the optimal production techniques that will maximize the production.

Building a reservoir characterization model may involve formation evaluation techniques like core analysis and well logging that assist in characterizing the reservoir. Such formation evaluation techniques may be undertaken to determine fundamental properties of a reservoir and how these properties affect hydrocarbon production. Core analysis is an important part of the formation evaluation process, enabling the study of samples of reservoir rock to determine well conditions and as a result, the ability of the formation to produce hydrocarbons. Core analysis starts with coring, which is a means of obtaining additional information about the reservoir, unavailable from other sources such as well logs. Coring involves obtaining cylindrical samples of rock (e.g., cores) from a drilled well and analyzing these cores at the wellsite or in the laboratory to determine fundamental rock properties such as lithology, porosity, permeability and saturation of the various fluids in the formation. Knowledge of these properties can help to get an idea of whether a formation contains commercial amounts of recoverable hydrocarbons. In the past, core analysis was predominantly undertaken at the well site. However, nowadays, as technologies have become more complex, the process is almost entirely carried out in the laboratory.

Core analysis can include evaluation of rock properties and anisotropy; organic matter content, maturity, and type; fluid content; fluid sensitivity; and geomechanical properties. This information can be used to calibrate log and seismic measurements and to help in well and completion design, well placement, and other aspects of reservoir production (e.g., reservoir modelling and simulation, creation of FDPs). After coring, the first step of core analysis may include describing the core. That is, the composition of the rock, its structure and texture and other characteristics discernible from a visual inspection of the core may be identified and described as core description data or logs. Such core description logs may reflect core feature information related to core thickness, grain size, sedimentary structures, accessories such as fossils and diagenetic features, lithologies and nature of contacts between different lithologies, textural maturity, oil staining, fracturing, porosity, and the like. The core description data may then be processed and analyzed along with well log data, after which the facies can be tracked and the geological reservoir characterization model can be built for generating or updating FDPs.

As can be appreciated, formation evaluation can be a time consuming process for geologists. If the scale of the core description if large, it may take a geologist several weeks just to complete the task of describing the core. Careful examination and accurate recording of information from continuous cores provides critical data for building a good model or simulation. Above described traditional manual identification and description of carbonate cores and generation of core logs by geologists is labor intensive and time consuming, leading to increased costs and manpower. Moreover, manual identification and description of carbonate cores is inherently subjective in that the same core may be described in different ways by different geologists. It is desirable to build accurate reservoir characterization or earth models for the reservoir by quickly, precisely, and consistently recognizing and describing carbonate sedimentological features of the rock so that generation of core description logs can be accelerated and automated while saving manpower and reducing costs.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method for detection of carbonate core features from core images includes: separating an input carbonate core image into a plurality of first blocks, each of the plurality of first blocks having a first block size; inputting an image of each of the separated plurality of first blocks into an artificial intelligence (AI) model, the AI model being trained to predict for each first block, one of a plurality of carbonate core features and a corresponding confidence value indicating a confidence of the predicted carbonate core feature being imaged in the first block; detecting any bounding boxes of a first set of bounding boxes in the input core image based on the predicted one of the plurality of carbonate core features and the corresponding confidence values for each first block; detecting a second block size, and separating the input carbonate core image into a plurality of second blocks, each of the plurality of second blocks having a second block size, wherein the second block size is dynamically detected based on the prediction of the AI model for each of the plurality of first blocks having the first block size; inputting an image of each of the separated plurality of second blocks into the AI model, the AI model being trained to predict for each second block, one of the plurality of carbonate core features and a corresponding confidence value indicating a confidence of the predicted carbonate core feature being imaged in the second block; detecting any bounding boxes of a second set of bounding boxes in the input core image based on the predicted one of the plurality of carbonate core features and the corresponding confidence values for each second block; combining the detected bounding boxes of the first and second sets in the input core image; counting a number of instances of each of the plurality of carbonate core features in the input carbonate core image based on the combined bounding boxes of the first and second sets; and generating a carbonate core description for the input carbonate core image based on the counted number of instances of each of the plurality of carbonate core features.

In another embodiment, the method may be embodied in computer executable program code and stored in a non-transitory storage device. In yet another embodiment, the method may be implemented on a system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 5A-5H show an exemplary input carbonate core image that is processed by the automated core description generation system to generate corresponding carbonate core description data in accordance with one or more embodiments.

Figure 1:
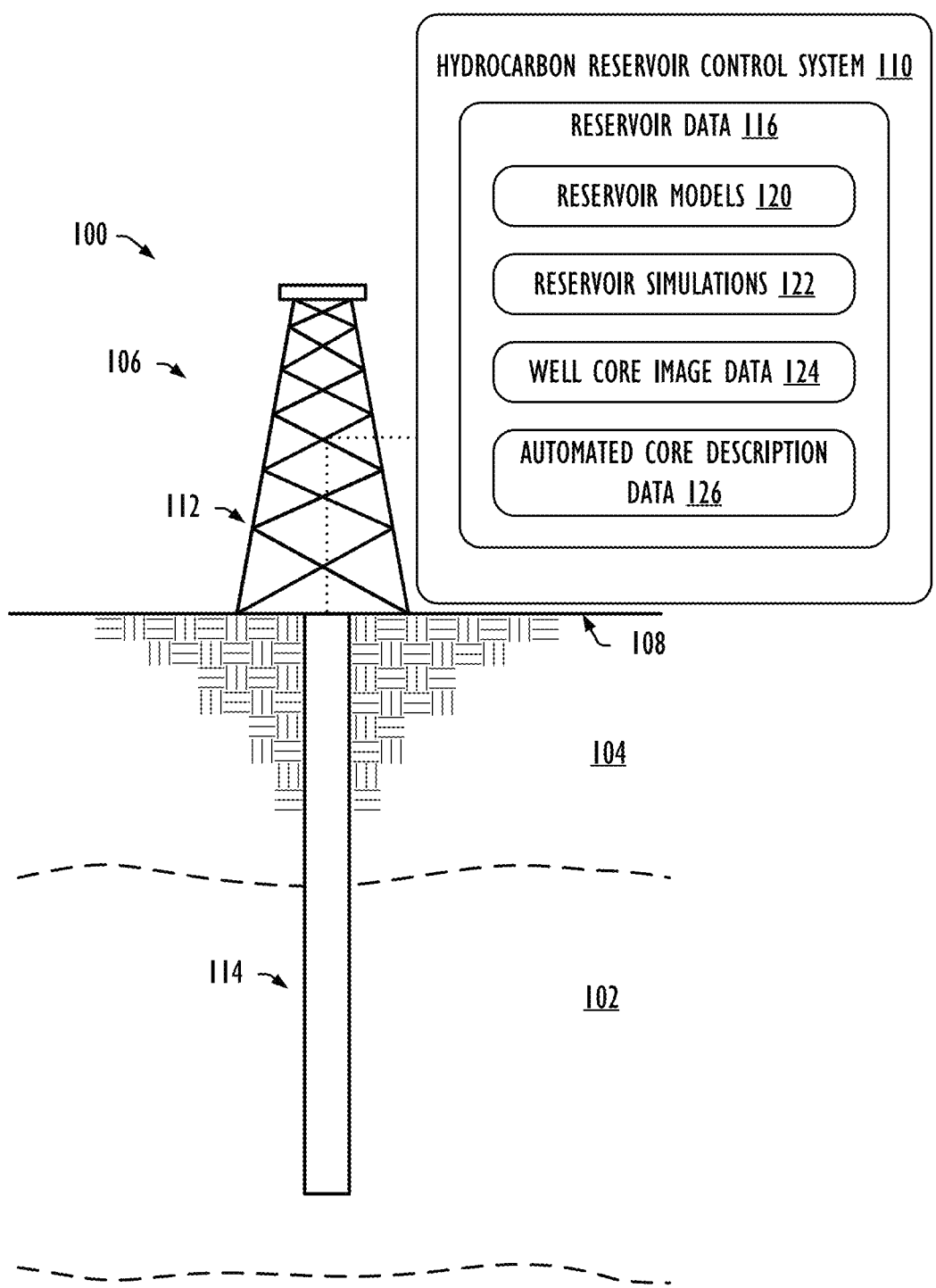
FIG. 1 is a schematic diagram of a hydrocarbon reservoir environment in accordance with one or more embodiments.

While certain embodiments will be described in connection with the illustrative embodiments shown herein, the subject matter of the present disclosure is not limited to those embodiments. On the contrary, all alternatives, modifications, and equivalents are included within the spirit and scope of the disclosed subject matter as defined by the claims. In the drawings, which are not to scale, the same reference numerals are used throughout the description and in the drawing figures for components and elements having the same structure.

DETAILED DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the disclosed subject matter, and multiple references to "one embodiment" or "an embodiment" or "another embodiment" should not be understood as necessarily all referring to the same embodiment.

This disclosure pertains to a system and method for automatically generating carbonate core description for input images of carbonate cores. Techniques disclosed herein look to detect (e.g., classify, predict, identify, and the like) and count instances of carbonate core features (e.g., grain size, sedimentary structures, sedimentological features, accessories such as different fossils and diagenetic features, lithologies and nature of contacts between different lithologies, textures or patterns, structural features, types of bedding planes, type of stone, cementation, non-geologic features like numbers or tags on the rock core, dents or voids in the core, voids created by core plug holes, and the like) in input images of slabbed carbonate cores by utilizing artificial intelligence (AI) based models that are trained to perform the detection operation based on labeled (known) image data of carbonate cores. Conventional manual identification and description of carbonate cores is labor intensive and time-consuming. The present disclosure utilizes AI and machine learning techniques for classification and fine counting operations such as depth convolutional neural network (CNN), support vector machines (SVM), boosted trees, XGBOOST, artificial neural network (ANN), k-nearest neighbors (KNN), random forest, and the like to automatically and quickly generate an accurate carbonate core description by individually detecting and counting carbonate core features in an input core image.

An automated core description generation system according to the present disclosure may include an AI model (e.g., a depth CNN model) that is constructed and trained using a bank of images representing different carbonate core features that are to be detected by the model in new input core image data. Each image in the bank of training images may represent a single feature that has been isolated in the image regardless of the image size. For example, the AI model may be trained using images representing individual features (e.g., images of a type of fossil) isolated from surrounding geology (e.g., fossil against a white background) so that the model may perform feature extraction and learn to detect the particular feature in unseen new images. The model may also be trained using a cropped image or a subset of image of a carbonate core itself without being separated from the rock (e.g., including surrounding geology) so that the model can learn detect other carbonate core features that have been isolated in the cropped image like grain size (e.g., gravel, sand, clay), stone type, structural features, types of bedding planes, and the like. Once training (and testing) is completed, the model may be deployed to detect features it has trained on in an input image and also indicate corresponding confidence values for the detected features.

The system may further include logic (e.g., gridding engine) for allowing a user to input a minimum and maximum grid cell or block size, and logic for automatically separating (e.g., separation engine) an input image of the carbonate core into blocks defined based on grid cell or block sizes between the input minimum and maximum grid cell sizes. The system may be configured to run an input image through the AI network with different dynamically determined (scalable) grid cell sizes between the user defined minimum and maximum values to identify multiple features of varying sizes in the input image during the different runs (e.g., epochs) on the image through the network. The system may further include logic (e.g., counting module) to count the number of instances of each carbonate core feature (e.g., class or label the AI model is designed to detect) detected in the input image by the network. Optionally, a fine tuning model (e.g., support vector machine model, boosted trees, XGBOOST, KNN, and the like) of the system may take numerical detection results output from the AI network as input and fine tune the predictions of the AI network to further improve detection accuracy of the system. Finally, a numerical output of the fine tuning model (or of the AI network is no fine tuning model is implemented) may be input to a core description text generation engine to convert the numerical output to a core description in textual form by utilizing a core description text dictionary that replaces the numerical output with words or phrases, and by joining together the corresponding words or phrases to generate a final carbonate core description for the input core image.

After training is complete, the AI network (e.g., AI model, gridding engine, separation engine, counting module) may be utilized to automatically generate core description for new or unseen core image data. The input image may undergo the operation of separating the image into cells or blocks of sizes defined based on the user input minimum and maximum grid cell or block sizes. The separated image blocks or cells may then be input into the network to detect features. Separating the image into blocks may allow the network to detect features of differing sizes and also detect multiple instances of the same feature. Further, separating the image into blocks allows the network to accept any image as an input regardless of the resolution or size of the input image. The system may run the input image through the AI network multiple times (e.g., multiple runs or epochs) based on a class probability map generated at every epoch with a particular cell or block size. A counting operation may then be performed to count the number of instances of each carbonate core feature detected in the input image by the network, and a numerical output of the detection and counting operations of the AI network may be subject to (optional) fine tuning to improve detection accuracy. Finally, the fine-tuned detection and counting results may be converted to core description text based on a dictionary in which the numerical outputs are keyed to text core descriptions. And the detected core description text corresponding to the different detected core features may be joined and output as the carbonate core description text (e.g., log or data) for the input image. The system and method is thus able to accelerate slabbed core description for carbonates, which can later be used to build an earth model. Moreover, the system and method automates the data identification process while efficiently generating core description text for input core images with high levels of accuracy and consistency, thereby reducing required human effort, saving manpower, and reducing costs.

FIG. 1 is a diagram that illustrates a hydrocarbon reservoir environment (e.g., reservoir environment or well environment) 100 in accordance with one or more embodiments. In the illustrated embodiment, reservoir environment 100 includes a hydrocarbon reservoir ("reservoir") 102 located in a subsurface formation ("formation") 104, and hydrocarbon reservoir development system 106. Formation 104 may include a porous or fractured rock formation that resides underground, beneath the Earth's surface ("surface") 108. Reservoir 102 may include a portion of formation 104 that contains (or that is determined to contain) a subsurface pool of hydrocarbons, such as oil and gas. Formation 104 and reservoir 102 may each include different layers of rock having varying characteristics (e.g., varying degrees of permeability, porosity, lithology, geology, or fluid saturation). Hydrocarbon reservoir development system 106 may facilitate extraction (or "production") of hydrocarbons from reservoir 102. In some embodiments, hydrocarbon reservoir development system 106 includes a hydrocarbon reservoir control system ("control system") 110 and (one or more) well 112. In some embodiments, control system 110 includes a computer system that is the same as or similar to that of computer system 600 described with regard to at least FIG. 6. Well 112 may include wellbore 114 that extends from surface 108 into a target zone of formation 104, such as reservoir 102. Wellbore 114 may be created, for example, by a drill bit boring along a path (or trajectory) through formation 104 and reservoir 102.

In some embodiments, control system 110 controls operations for developing reservoir 102. Although FIG. 1 illustrates control system 110 as being disposed at a location proximal to well 112, this may not necessarily be the case. For example, control system 110 may be provided at a remote location (e.g., remote control center, core analysis lab, data center, server farm, and the like) that is remote from well 106. Control system 110 may control one or more formation evaluation operations (e.g., well logging operations, core analysis operations, coring operations, and the like) used to acquire data of reservoir 102, and may control processing that automatically generates core description data based on core image data, and models and simulations generated based on data including image data of reservoir 102 that characterize the reservoir 102. Alternately, an external system may control to automatically generate core description data based on core image data of wellbore 114, and control system 110 may control and implement models and simulations generated based on the automatically generated core description data.

In some embodiments, control system 110 determines drilling parameters for well 112 in reservoir 102, determines operating parameters for well 112 in reservoir 102, controls drilling of well 112 in accordance with drilling parameters, or controls operating well 112 in accordance with the operating parameters. This can include, for example, control system 110 determining drilling parameters (e.g., determining well location and trajectory) for reservoir 102, controlling drilling of well 112 in accordance with the drilling parameters (e.g., controlling a well drilling system of the hydrocarbon reservoir development system 106 to drill well 112 at the well location and with wellbore 114 following the trajectory), determining operating parameters (e.g., determining production rates and pressures for "production" well 112 and injection rates and pressure for "injection" well 112), and controlling operations of well 112 in accordance with the operating parameters (e.g., controlling a well operating system of the hydrocarbon reservoir development system 106 to operate the production well 112 to produce hydrocarbons from reservoir 102 in accordance with the production rates and pressures determined for well 112, and controlling the injection well 112 to inject substances, such as water, into reservoir 102 in accordance with the injection rates and pressures determined for well 112).

In some embodiments, control system 110 stores in a memory, or otherwise has access to, reservoir data 116. Reservoir data 116 may include data that is indicative of properties of reservoir 102. In some embodiments, reservoir data 116 includes one or more models of the reservoir 102 (e.g., reservoir models) 120, one or more simulations of reservoir 102 (e.g., reservoir simulations) 122, well core image data 124, and automated core description data 126. A reservoir model 120 may include a three-dimensional (3D) grid of cells representing a portion of reservoir 102. Each of the cells may include a cuboid cell (or similar shaped cell) that represents a corresponding volume within reservoir 102. Each of the cells may be associated with properties of the volume represented by the cell. The properties may include properties of the volume itself (e.g., permeability, porosity or fluid saturation of the rock located in volume represented by the cell) or properties of interfaces with adjacent cells (e.g., fluid fluxes that represent fluid interchange between the volume represented by cell and respective ones of the other volumes represented by cells directly adjacent to the cell). The properties of each of the cells may be determined based on data acquired for reservoir 102, such as data of seismic logs of reservoir 102, data of downhole logs of wells drilled into reservoir 102, data acquired (e.g., well core image data 124) by way of assessment core samples extracted from reservoir 102, or data recorded for another reservoir having characteristics that are the same or similar to those of reservoir 102.

A simulation 122 of reservoir 102 may include data that represents predicted movement of fluids, such as water or hydrocarbons, within reservoir 102 and the production of fluids, such as hydrocarbons, from reservoir 102, over time. In some embodiments, a simulation of reservoir 102 is generated based on reservoir model 120. For example, reservoir simulation 122 may include a snapshot of where fluid is expected to be within reservoir 102 one year from now, and a volume of hydrocarbons to be produced from reservoir 102 over the year, based on reservoir model 120 that indicates present characteristics of reservoir 102 (e.g., a modeling of the current location of water and hydrocarbons in reservoir 102) and expected operating parameters for reservoir 102 over the next year (e.g., a predicted set operating flowrates and pressures for well 112 over the next year). Simulation 122 may be used to determine how to develop reservoir 102. For example, simulation 122 of reservoir 102 may be used to determine drilling or operating parameters for well 112 in reservoir 102.

As explained previously, reservoir model 120 may be developed based, at least in part, on properties derived from core samples extracted wellbore 114 of reservoir 102. For example, cylindrical samples of rock (e.g., whole cores, partial cores, continuous cores, slabbed cores, core plugs, sidewall cores) may be obtained from one or more regions of wellbore 114 (e.g., region of wellbore 114 corresponding to reservoir 102) of well 112 by using a core drilling bit. The obtained rock samples (e.g., slabbed core surfaces of the cylindrical samples of rock from the one or more regions of wellbore 114) may be photographed (e.g., scanned, imaged using an imaging device (cell phone, digital camera, and the like) under one or more light sources, and the like) to generate well core image data 124.

For each section of the core sample of wellbore 114 (e.g., each one foot section of a continuous core), well core image data 124 may include a corresponding captured core image, which may be tagged or associated with corresponding generated core description data 126 describing carbonate core features of the corresponding section of the core sample. For example, for each section of the continuous core, the corresponding core description data 126 may include carbonate feature information (e.g., text) related to grain size (e.g., gravel, sand, slit, clay), sedimentary structures, sedimentological features, accessories such as different fossils (e.g., brachiopods, gastropods) and diagenetic features, lithologies and nature of contacts between different lithologies, textures or patterns, structural features (e.g., stylolite), textural maturity, oil staining, fracturing, porosity, types of bedding planes, cementation, type of stone, non-geologic features like numbers or tags on the rock core section, dents or voids in the core, voids created by core plug holes, core thickness, and the like. Well core image data 124 and corresponding core description data 126 may thus describe a continuous core sample obtained from wellbore 114, and may be used for developing reservoir models 120 and reservoir simulations 122. Core description data 126 may be automatically generated using automated core description generation system 200 shown in FIG. 2, and based on well core image data 124.

Figure 2:
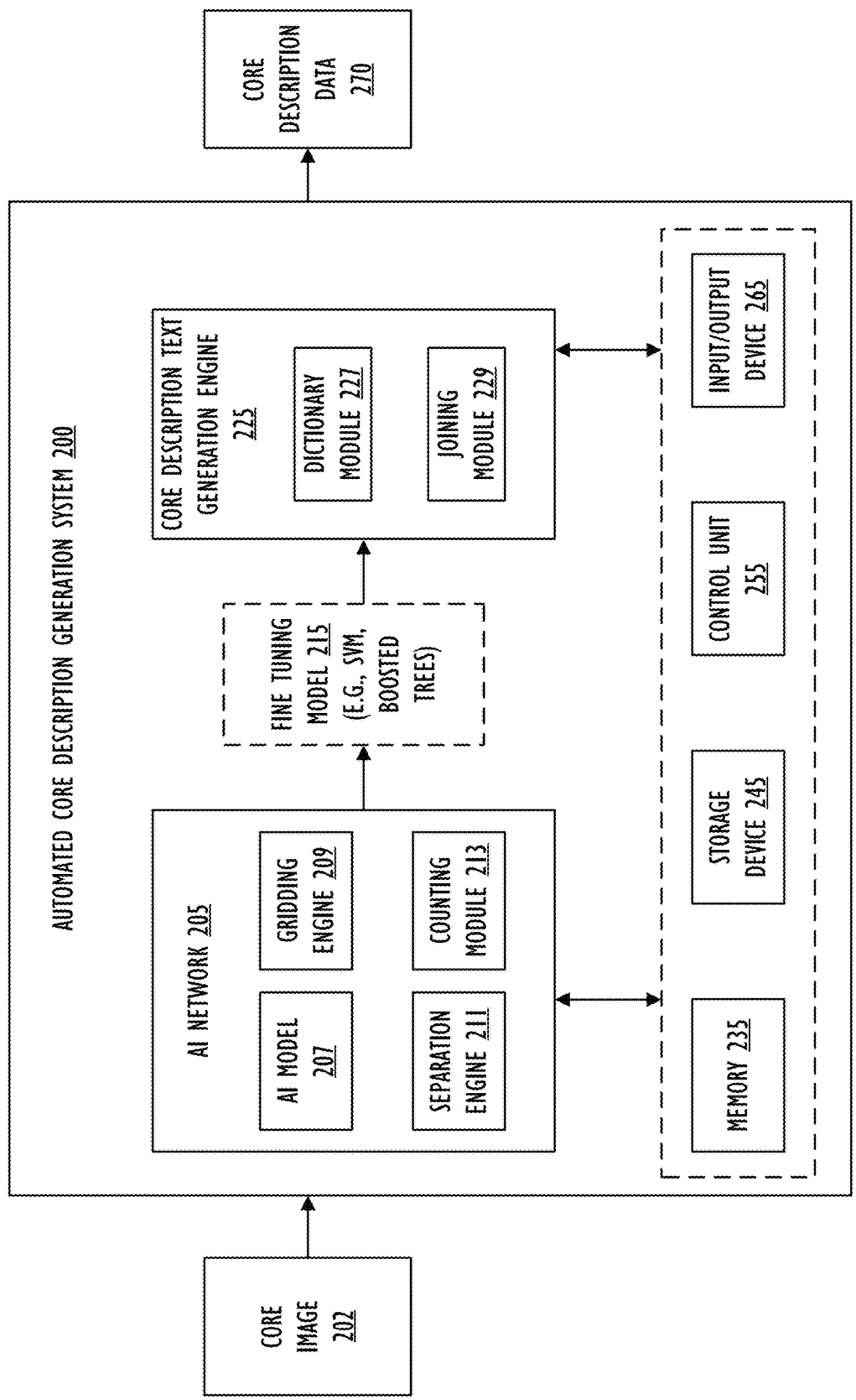
FIG. 2 is a functional block diagram of an automated core description generation system in accordance with one or more embodiments.

FIG. 2 is a functional block diagram of automated core description generation system 200 in accordance with one or more embodiments. As shown in FIG. 2, automated core description generation system 200 includes AI network 205, fine tuning model 215, core description text generation engine 225, memory 235, storage device 245, control unit 255, and input/output device 265. Automated core description generation system 200 may include a computer system that is the same as or similar to that of computer system 600 described with regard to at least FIG. 6. In addition, automated core description generation system 200 may be implemented, in whole or in part, on hydrocarbon reservoir control system 110 (not shown in FIG. 1). Alternately, automated core description generation system 200 may be implemented on a remote computer system that is separate from hydrocarbon reservoir control system 110, and the output of automated core description generation system 200 may be used to develop the models and simulations stored on control system 110.

Automated core description generation system 200 may accept as input core image 202 (e.g., well core image data 124) and output core description data 270 (e.g., automated core description data 126; core description text or log) that describes and identifies features detected in core image 202. Alternately, system 200 may output the core image tagged with the corresponding core description data 270. As explained previously, manual generation of core description data 270 by geologists based on careful examination and visual inspection of corresponding image data and recording of information for continuous carbonate cores can be a labor intensive, time consuming, inconsistent, and expensive. By implementing automated core description generation system 200, carbonate feature information describing continuous cores can be quickly and automatically generated for a plurality of core images corresponding to a continuous core in an cost effective and efficient manner. Feature information that automated core description generation system 200 may be configured to detect as core description data 270 and based on input core image 202 data may include different grain sizes, different sedimentary structures, different sedimentological features, accessories such as different fossils and diagenetic features, lithologies and nature of contacts between different lithologies, different textures or patterns, different structural features (e.g., stylolite), textural maturity, oil staining, fracturing, porosity, different bedding planes, type of stone, cementation, non-geologic features like numbers or tags on the rock core section, dents or voids in the core, voids created by core plug holes, core thickness, and the like.

Storage device 245 and memory 235 may store and/or retrieve data, which can include training image data (e.g., bank of training images and corresponding core descriptions representing different features the model is trained to detect), data and programming logic associated with AI network 205, fine tuning model 215, and core description text generation engine 225, data associated with core image(s) 202 and corresponding generated core description data 270, data describing input/output devices 265, and/or metadata associated with the data. Memory 235 may be implemented using any suitable (volatile and/or non-volatile) memory technology to store program instructions and data associated with one or more components of automated core description generation system 200. Automated core description generation system 200 may also include input/output devices 265. For example, input/output devices 265 may include at least one of the following: (i) one or more input devices that interact with or send data to one or more components of automated core description generation system 200 (e.g., mouse, keyboards, wireless Bluetooth® peripheral, etc.); (ii) one or more output devices that provide output from one or more components of automated core description generation system 200 (e.g., internal or built-in monitors, printers, haptic feedback devices/systems, etc.); or (iii) one or more storage devices that store data in addition to memory 235 and storage device 245. (Bluetooth® is a registered trademark of Bluetooth SIG, Inc, Washington, USA). Input/output devices 265 may combine different devices into a single hardware component that can be used both as an input and output device (e.g., a touchscreen, and the like). Control unit 255 may include CPUs, GPUs, digital signal processors (DSPs), and/or other types of integrated circuits (ICs). Control unit 255 may also contain circuits such as memory, processors, application specific integrated circuits, and other storage and processing circuitry. Control unit 255 may be configured to communicate with other components of automated core description generation system 200. Control unit 255 may thus enable automated core description generation system 200 to perform various image processing, detection and counting operations on input core image data, perform fine tuning operations on the detection and counting operation output, and perform operations to generate core description data 270 based on the fine tuning operation output.

Automated core description generation system 200 may utilize AI and machine learning techniques to identify or detect carbonate core features in a given input core image or portion (e.g., blocks or cells) of the image. More specifically, automated core description generation system 200 may include AI network 205 configured to perform various image processing operations (e.g., via gridding engine 209, separation engine 211) on the input core image 202, identify carbonate core features (e.g., via AI model 207), and count the number of instances of each carbonate core feature (e.g., number of instances of each detected class or label) in the input image (e.g., via counting module 213). In some embodiments, AI network 205 may generate a numerical output that represents the detection or identification and counting operation results for input image 202. The numerical output of AI network 205 may be subject to a fine tuning operation to improve detection accuracy of the results by fine tuning model 215, and the numerical output may then be converted to core description data 270 by utilizing dictionary module 227 of core description text generation engine 225 to convert individual numerical outputs and corresponding counts to corresponding keyed textual descriptions, and joining module 229 of core description text generation engine 225 to join the corresponding keyed textual descriptions together to generate the final output core description data 270.

Specifics of constructing, training, and developing program instructions or logic associated with one or more components of AI network 205, fine tuning model 215, core description text generation engine 225, are described in detail below in connection with the flowchart shown in FIG. 3. Further, specifics of the operation of one or more components of AI network 205, fine tuning model 215, core description text generation engine 225, after automated core description generation system 200 has been deployed and implemented for automated generation of core description data, are described in detail below in connection with the flowchart shown in FIG. 4, and by way of a specific exemplary input core image processed by the system as shown in FIG. 5.

Figure 3:
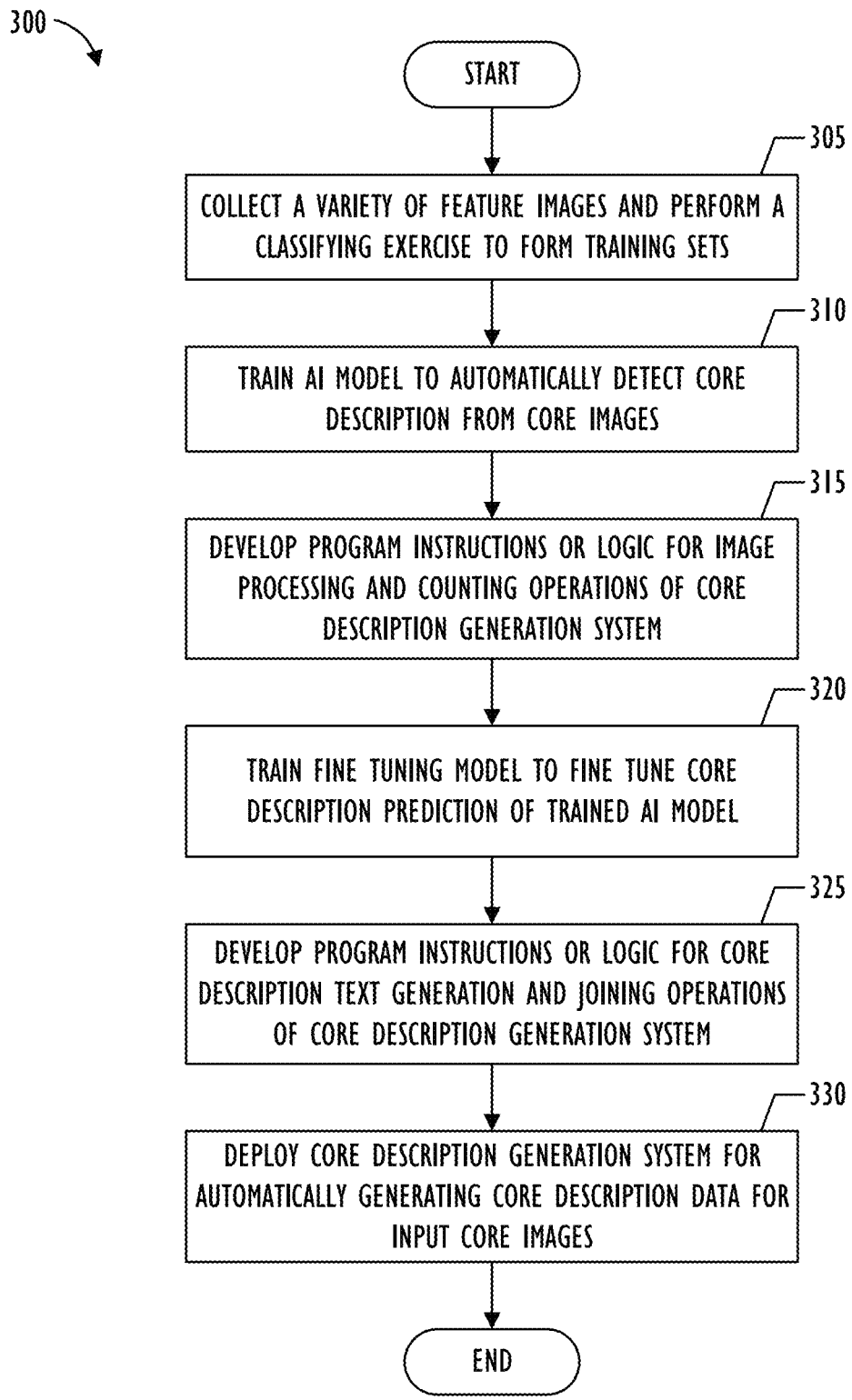
FIG. 3 is a flow chart that illustrates a method for constructing, training, and developing a system for automated core description generation in accordance with one or more embodiments.

FIG. 3 is a flow chart that illustrates method 300 for constructing, training, and developing a system for automated core description generation in accordance with one or more embodiments. In some embodiments, the automatic carbonate core feature identification and core description generation system and method may be based on a depth convolutional neural network (CNN), and associated program instructions may be written in the Python programing language. As shown in FIG. 3, method 300 begins at block 305 where a variety of feature images (e.g., bank of 1000s of images) corresponding to a variety of carbonate core features may be collected and a classifying exercise (e.g., feature identification and core description generation by trained geologists) may be performed to form training sets (e.g., multiple images per class or label corresponding to a particular carbonate core feature) corresponding to the plurality of classes (i.e., plurality of carbonate core features or points). The variety of carbonate core features for which respective training sets of sample feature images may be collected for training at block 305 may include different grain sizes, different sedimentary structures, different sedimentological features, different accessories such as different types of fossils and diagenetic features, different lithologies and nature of contacts between different lithologies, different textures or patterns, different structural features (e.g., stylolite), different textural maturity, different oil staining, different fracturing, different porosity, different bedding planes, different types of stone, different cementation, non-geologic features like different numbers or tags on the rock core section, dents or voids in the core, voids created by core plug holes, core thickness, and the like. The training image data collected at block 305 can be from any well site, field, or basin and can be used to train the AI model to predict the features and automatically create the carbonate core description for a new well site. For example, historic continuous core image data and corresponding manually (or automatically) generated core description log data from one or more carbonate core well sites, fields, or basins can be used at block 305.

Block 305 may also involve calculating a predetermined value (e.g., mean value of image) for each of the plurality of classes (training sets) respectively corresponding to each of the plurality of carbonate core features the model is being trained to detect. The number of the different types of carbonate core features corresponding to which image sets are being collected at block 305 is not limited, and depends on how many, how granular, and what types of carbonate core features the user wants to be able to predict in new unseen images. Block 305 may further involve constructing an AI model (e.g., AI model 207 of FIG. 2) that is to be trained using the collected image data. The AI model may be a mathematical model (e.g., machine or deep learning model like a depth CNN model) for making image data driven predictions (e.g., detections, classifications, identifications, and the like). Known image data having a known core description (e.g., the collected and classified data at block 305) may be used to train the depth CNN model to detect the carbonate core features that make up the core description for new input image data of a new well site.

The training set of images is provided for each class or carbonate core feature the AI model is being trained to detect. Each image in each training set collected and classified at block 305 represents a particular class or label or carbonate core feature. The images collected at block 305 can be of any size. That is, instead of using the "padding" technique used in conventional AI models, the AI model and corresponding system according to the present disclosure is configured to accept any image size as input. Regardless of image size, a single feature is isolated in each image and the image is added to the corresponding training set for learning to detect that single feature. Further, the images collected at block 305 can have varying characteristics. For example, the collected and classified images that represent a first carbonate core feature (e.g., a particular type of fossil) may show the corresponding fossil against a white background in the images thereof in the training set. That is, the fossil feature may be isolated from the surrounding geology in the image and such an image may be used for training the model to detect the particular fossil type. As another example, the collected and classified images that represent a second carbonate core feature (e.g., a particular grain size, a particular structural feature, and the like) may show the corresponding feature as part of the rock itself. That is, the images in the training set for such a feature may include cropped images of the carbonate core itself, not separated from surrounding geology (e.g., no white background; but isolated to show only the second carbonate core feature).

Method 300 may then proceed to block 310 where the depth CNN model is trained using the image data collected and classified at block 305. At block 310, a cropped image randomly collected at block 305 may also be used to train and test the AI model. An optimization algorithm (e.g., Adam algorithm, mini-batch random gradient descent algorithm, and the like) may be used at block 310 to ensure the trained AI model does not over-fit the training image data. In some embodiments, the AI model may be a depth CNN model that is constructed using a sophisticated modified network architecture of a combination of different network architectures including alexnet, resnet, densnet, vgg19, and the like. Using a combination of network architectures reduces the uncertainty and enhances the model learning capabilities. In another embodiment, AI model may be a CNN Long Short-Term Memory Network (CNN-LSTM) model which is designed for sequence prediction, and for use cases where, for example, the sedimentological data suggests that the reservoir depositional sequences are in high frequency. In some embodiments, the AI model (e.g., depth CNN model) trained at block 310 may include 24 layers including convolutional layers and dual connected layers. The convolutional layers may be designed to extract image features and the dual connected layers may be used to classify the input image by outputting a predicted probability value for each class (e.g., carbonate core feature) represented in the output layer. Once training is completed, the CNN model will be able to classify an input carbonate core image to one of the plurality of classes it is trained on and also output a confidence value indicating the level of confidence (e.g., between 0 and 1) that the image belongs to the predicted class. The model trained at block 310 may be AI model 207 of FIG. 2. After training of the CNN model is completed at block 310, the trained CNN model may be tested on a carbonate core with different features to perform a test run, adjustments to the parameters of the model made, and the AI model may subsequently be deployed on automated core description generation system 200, and new image data (e.g., well core image data 124 of well 106 of FIG. 1 that is currently undergoing reservoir model and reservoir simulation development) may be fed into the depth CNN model, which may then produce responses (e.g., prediction, classification, identification of features that make up the core description text or log) to the new input data, one image at a time.

Method 300 then proceeds to block 315 where programming logic or instructions for image processing operations (e.g., operations associated with gridding engine 209 and separation engine 211 of FIG. 2) and counting operations (e.g., operations associated with counting module 213 of FIG. 2) are developed. For example, operations developed at block 315 may include operations to allow a user to input a minimum and maximum grid cell size, and operations for automatically separating an input image of the carbonate core into blocks defined based on the input minimum and maximum grid cell sizes. The logic developed at block 315 may further configure the automated core description generation system to run an input image through the AI network with different dynamically determined and scalable grid cell sizes between the user defined minimum and maximum values to identify multiple features of varying sizes in the input image during the different runs (e.g., epochs) on the image through the network. Still further, the logic developed at block 315 may configure the automated core description generation system to count the number of instances of each carbonate core feature detected in the input image. That is, the detection performed by the model may be granular so that each instance of each carbonate feature may be separately and individually detected in the core image. In case multiple instances of the same feature are detected in the image, the logic developed at block 315 enable the system to count the number of instances of the same feature detected multiple times in the image. Specifics of operation of the program instructions or logic developed at block 315 (e.g., operations associated with gridding engine 209, separation engine 211, and counting module 213 of FIG. 2) will be described in detail below in connection with the flowchart shown in FIG. 4, and by way of a specific exemplary input core image processed by the system as shown in FIG. 5.

Method 300 then proceeds to block 320 where a fine tuning model (e.g., support vector machine model, boosted trees, KNN, ANN, and the like) is trained to fine tune the detection results of the AI model trained at block 310 and the counting operation results of the counting module developed at block 315. For example, the fine tuning model may take numerical output of the detection and counting operations of the AI network as input and fine tune the predictions to further improve detection accuracy. The fine tuning model at block 320 may be trained using the known core image data whose carbonate core features have already been identified and counted. More specifically, each piece of image data in the known image data used for training the AI model at blocks 305 and 310 may represent and include therein a single carbonate core feature out of a plurality of carbonate core features the model is trained to predict. That is, in the training data at blocks 305 and 310 for the AI model, a single feature is isolated in each image. On the other hand, the core image data used for training the fine tuning model at block 320 may represent and include therein a plurality of carbonate core features in the same image. That is, the known core image data used for training at block 320 may correspond to the core images (e.g., images of successive one foot sections of slabbed carbonate core) whose the core description data (e.g., "Stromatoporoid-dominated grain stone with stylolite") is known, and where multiple carbonate core features are included in each training image.

Next, at block 325 programming logic or instructions for core description text generation operations (e.g., operations associated with dictionary module 227 of FIG. 2) and joining operations (e.g., operations associated with joining module 229 of FIG. 2) are developed. For example, operations developed at block 325 may include operations to create a core description text dictionary in which respective numerical outputs of the fine tuning model (or of the AI network) are keyed to core description texts, and operations to join together the corresponding core description texts based on the numerical outputs of the AI model or the fine tuning model, so as to generate the final core description data automatically generated for an input core image. Specifics of operation of the program instructions or logic developed at block 325 (e.g., operations associated with dictionary module 227, and joining module 229 of FIG. 2) will be described in detail below in connection with the flowchart shown in FIG. 4, and by way of a specific exemplary input core image processed by the system shown in FIG. 5. Finally, at block 330, the core description generation system (e.g., system 200 of FIG. 2) constructed, trained, and developed at blocks 305-325 may be deployed for automatically generating core description data for new input carbonate core images.

Figure 4:
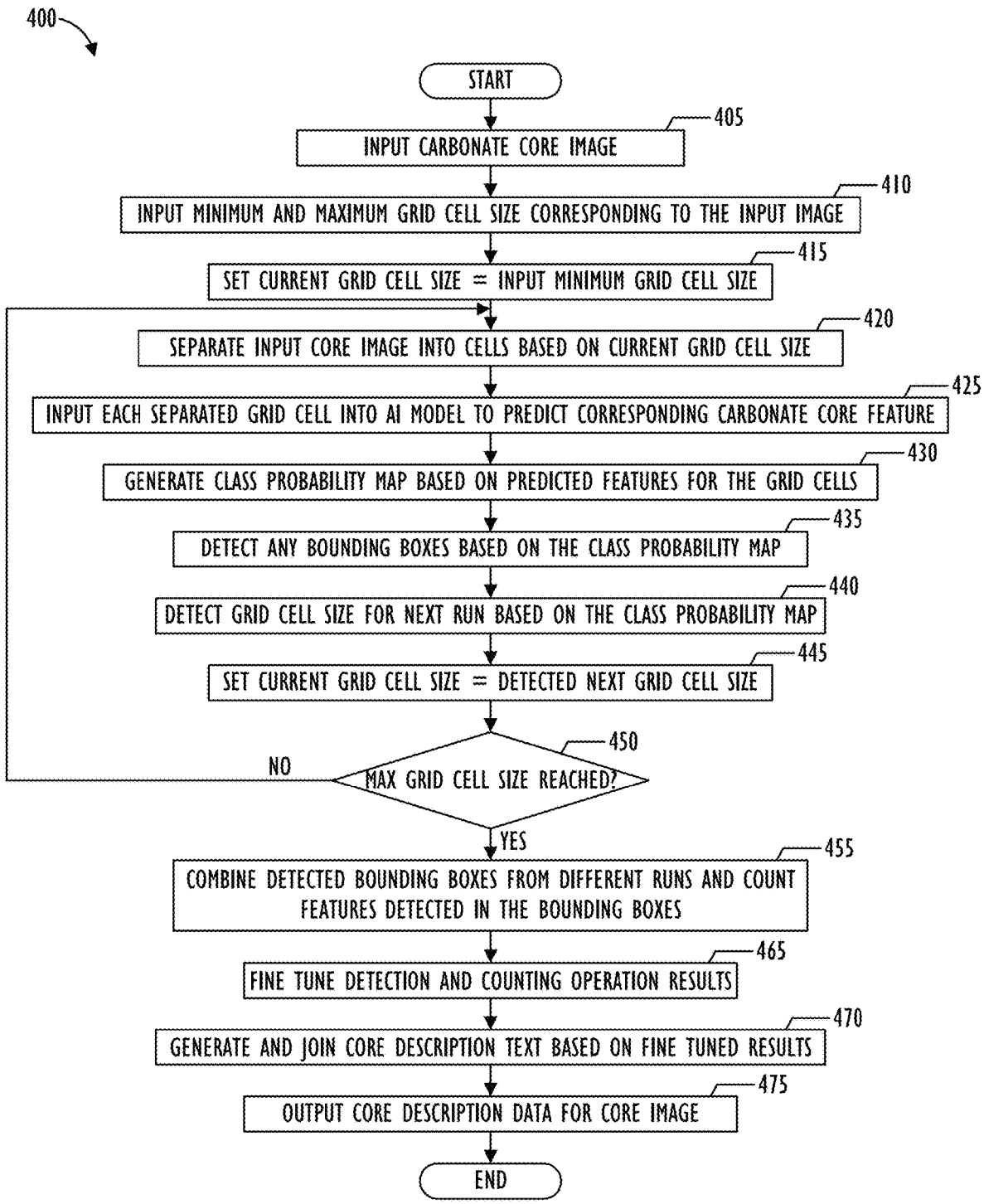
FIG. 4 is a flow chart that illustrates a method for automatically generating core description data in accordance with one or more embodiments.

FIG. 4 is a flow chart that illustrates method 400 for automatically generating core description data with an automated core description generation system in accordance with one or more embodiments. In addition, FIGS. 5A-5H show an exemplary input carbonate core image that is processed by the automated core description generation system to generate corresponding carbonate core description data, in accordance with one or more embodiments. After the automated core description generation system 200 of FIG. 2 has been constructed, trained, and developed as shown in method 300 of FIG. 3, the system may be deployed for automatically generating core description data for new input carbonate core images. For example, after training and testing of the AI and fine tuning models of the core description generation system using historical core image data with known carbonate core descriptions from one or more wells of one or more reservoirs or basins, image data of a continuous carbonate core obtained from a particular wellbore (e.g., wellbore 114 of FIG. 1) that is currently undergoing reservoir model and simulation development may be input to the trained and deployed system (e.g., system 200 of FIG. 2) to generate automated carbonate core description data for the continuous core. This automatically generated core description data (e.g., automated core description data 126 of FIG. 1) may then be used to perform formation evaluation and reservoir characterization operations and generate models (e.g., reservoir models 120) and run simulations (e.g., reservoir simulations 122 of FIG. 1) on the generated models for the particular well (e.g., well 106 of FIG. 1) whose carbonate core image data was used as input to the core description generation system. As explained previously, the generated models and simulations may in turn be utilized to develop or update FDPs for the particular well, and/or set or update drilling parameters of the well, operating parameters of the well, and the like.

Method 400 begins at block 405 where the automated core description generation system (e.g., system 200 of FIG. 2) accepts as input, a carbonate core image (e.g., the core image shown in FIG. 5A) of a carbonate core of a well for which the core description data (and corresponding reservoir models and/or simulations) are to be generated. As explained previously, cylindrical samples of rock (e.g., whole cores, partial cores, continuous cores, slabbed cores, core plugs, sidewall cores, and the like) may be obtained from one or more regions of a wellbore of a well whose reservoir is being modeled and simulated. The obtained rock samples (e.g., slabbed core surfaces of the cylindrical samples of rock from the one or more regions of the wellbore) may be photographed (e.g., scanned, imaged using an imaging device (cell phone, digital camera, and the like) under one or more light sources, and the like) to generate well core image data corresponding to the core samples, and the images may be input to the system for processing at block 405, one core image at a time. For example, the image input at block 405 may be an image of one foot of a slabbed carbonate core (e.g., the image shown in FIG. 5A), and the core may be part of a continuous core obtained from and along a length of the wellbore (e.g., wellbore 114 of FIG. 1). The image (e.g., FIG. 5A) input at block 405 to the generation system could be of any size or resolution (e.g., 5000× 1500 pixels). Further, the image may be captured from any of a variety of sources such as a mobile phone camera, a high-resolution digital camera, a scanner for slabbed cores, and the like. Image resolution and the source of image data input at block 405 are not intended to be limiting and could be any appropriate carbonate core image that is to be subject to processing for generation of corresponding core description data (log or text). Method 400 may be performed for each subsequent input carbonate core image of a continuous core of a wellbore, and the processing at steps 405-475 may repeatedly be performed for each successive input image until the entire length of the continuous carbonate core of the wellbore has been described by the automated core description generation system.

Method 400 then proceeds to block 410 where the system (e.g., the gridding engine 209 of AI network 205 of FIG. 2) may accept as input from a user, values corresponding to minimum and maximum grid cell sizes. In one embodiment, the minimum and maximum grid cell size (e.g., minimum window size (x,y) and maximum window size (x,y)) values at block 410 may be predefined and set for a carbonate core description generation project for a particular wellbore, and the same set values may be utilized by the system for each successive core image of successive sections of the continuous carbonate core. Alternately, the values may be supplied by a user for the project. Image processing operations on the input image by the gridding engine and the separation engine may be performed based on the minimum and maximum grid cell sizes input at block 410. As a non-limiting example, for the input core image of FIG. 5A having a resolution of 5000×1500 pixels, and minimum grid cell size may be set at 224×224 pixels, and the maximum grid cell size may be set at 4000×1000 pixels. Alternately, the min and max values may be set as a percentage of the input core image size. Although image processing performed by the various steps of method 400 are explained with reference to FIG. 5A-5H, this reference to the carbonate core image in FIGS. 5A-5H is for ease of explanation and for illustrative purposes only, and is not intended to be limiting.

Next, at block 415, the system will set the current grid cell or block size to the input minimum grid cell size. For example, while processing the core image of FIG. 5A having a resolution of 5000×1500 pixels, the system (e.g., the gridding engine 209 of AI network 205 of FIG. 2) may set the current grid cell size to the minimum grid cell or block size of 224×224 pixels. At block 420, the system will separate the input core image into cells (e.g., first blocks) based on the current grid cell size. Continuing with the example of FIG. 5A, since the current grid cell size is set at the minimum grid cell size, the system (e.g., separation engine 211 of AI network 205 of FIG. 2) will separate (e.g., segment or divide) the carbonate core image input at block 405 into a plurality of cells or blocks of equal size, where each cell or block has the set current grid cell size (set at block 415). For example, as shown in FIG. 5B, the system (e.g., separation engine 211 of AI network 205 of FIG. 2) will divide the input image of FIG. 5A into a grid of cells, where each cell has the current set size of, e.g., 224×224 pixels (e.g., the set minimum cell size; first block size).

At block 425, the system may input each separated grid cell into the trained and deployed AI model to predict a corresponding carbonate core feature. The system may detect a single feature (class or label) for each cell at block 425. For example, starting with the block at the top left corner of FIG. 5B, the system may select the block or cell for processing, one block at a time. The system may crop (e.g., separate, divide, segment) from the input core image of FIG. 5A, an image corresponding to the selected cell and input the cropped image corresponding to the cell block into the system (e.g., AI model 207 of AI network 205 of FIG. 2) for processing (e.g., core feature detection operation) one block at a time.

The AI model may be designed to accept an image with a fixed predetermined size. Therefore, the cropped image of the cell block at block 425 may be subject to processing to match the fixed predetermined size. For example, the AI model may be trained to accept images having a particular pixel size (e.g., 100×100 pixels). Pixel interpolation or down sampling operations may be performed as needed by the system on the input image (e.g., image corresponding to one of the cells in FIG. 5B) to generate the image that is compatible for input to the AI model for feature extraction and detection. At block 425, the cell or block images (e.g., respective cropped images corresponding to the cells in FIG. 5B) may be input to the AI model (after any required interpolation or down sampling) for classification or prediction, one cell or block image at a time.

For each block or cell image that is input to the AI model, the AI model may be configured to predict (e.g., detect, identify, classify) a carbonate core feature and a probability or confidence value indicating a level of confidence that the feature imaged in the cropped cell or block belongs to the carbonate core feature class predicted by the AI model. As explained previously, the AI model is trained to classify each input image (e.g., cropped image corresponding to a single one of the blocks or cells of FIG. 5B) into one of the plurality of carbonate core feature classes the model is trained on. For example, the model may classify the top left cell of FIG. 5B as belonging to a first carbonate core feature class, and the model may further classify the another one of the cells in FIG. 5B as belonging to a second carbonate core feature class, and so on. Recall that the different carbonate core feature classes that the model is trained to detect include feature classes corresponding to different grain sizes (e.g., gravel, sand, clay), different sedimentary structures, different sedimentological features, different accessories such as different types of fossils (e.g., brachiopods, gastropods) and diagenetic features, different lithologies and nature of contacts between different lithologies, different textures or patterns, different structural features (e.g., stylolite), different textural maturity, different oil staining, different fracturing, different porosity, different bedding planes, different types of stone, different cementation, non-geologic features like different numbers or tags on the rock core section, dents or voids in the core, voids created by core plug holes, core thickness, and the like. Thus, for each cell in FIG. 5B, the model may detect a single one of the feature classes that has the highest probability value indicating that the corresponding carbonate core feature is imaged in the cropped image cell or block.

To perform the feature identification operation for each cell of FIG. 5B, the AI model may take the RGB pattern of the input image (e.g., cropped image corresponding to a single block or cell of FIG. 5B, subject to interpolation or down sampling), convert it to grayscale, convert again to reverse color, and identify the similarities between the training image data belonging to the various carbonate core feature classes or labels of the AI model and the data of the current input image. For example, the AI model may subtract the mean value of image corresponding to the current input image of one cell from the mean value of image that is calculated for each of the training sets corresponding to the different carbonate core feature classes representing the output layer of the AI model. The feature class or label for which the mean value of image has the lowest value for the current cell image may be detected by the AI model as the predicted feature class for the current input cell image. The AI model may perform the above identification operation for each cell of the input core image at block 430, and output for each cell, a corresponding predicted carbonate core feature class and a confidence value indicating the level of confidence (e.g., between 0 and 1) that the input cropped image belongs to the detected or predicted class.

At block 430, the system (e.g., gridding engine 209 and/or separation engine 211 of AI network 205) may generate a class probability map for the input core image based on the carbonate core features predicted for each of the cells at block 425. The class probability map may be generated based on the carbonate core feature class predicted at block 425 for each cell of the input image and based on the corresponding confidence or probability value indicating the level of confidence that the cell belongs to the predicted class. The class probability map may be generated to identify a subset of carbonate core features that are of interest for generating the carbonate core description from among the plurality of features the trained AI model is designed to predict. For example, non-geologic features may not be considered of interest. Based on the carbonate core feature class and corresponding probability value predicted for each cell in FIG. 5B, the system (e.g., gridding engine 209 and/or separation engine 211 of AI network 205) may generate a class probability map as shown in FIG. 5C. In the class probability map of FIG. 5C, cells marked with the RED label may indicate that a feature of interest (e.g., feature is among a subset of features out of the plurality of features) is detected in the cell and that its confidence value is higher than a first threshold value (e.g., predetermined first threshold value). The subset of carbonate core features that may be considered to be features of interest may include geologic features that form part of the carbonate core description. For example, the features of interest may include features corresponding to different grain sizes, different sedimentary structures, different sedimentological features, different accessories such as different types of fossils and diagenetic features, different lithologies and nature of contacts between different lithologies, different textures or patterns, different structural features (e.g., stylolite), different textural maturity, different oil staining, different fracturing, different porosity, different bedding planes, different types of stone, and cementation. That is, for example, non-geologic features may be considered to be features that are not of interest because they would not be included when describing the corresponding core image. In FIG. 5B, the AI model will detect for each cell, one of the different feature classes or labels based on similarity. When the detected class for a particular cell is a class from among the subset of classes that are considered to be of interest for creating the core description, the cell may be marked with the RED label. Further, the system at block 430 may mark the cell with the RED label only if the confidence or probability value that this cell includes a feature of interest is higher than a particular predetermined first threshold value (e.g., 20% confident that the image of the cell belongs to a detected carbonate core feature class that is of interest).

Non-geologic features such as voids or dents, cracks, core plug holes, and the like may be considered as features that are not of interest for creating the core description and thus, if a particular cell is determined at block 425 to contain such a non-geologic feature that is not of interest, the system may not mark such a cell with any label when generating the class probability map, regardless of whether the confidence value for this cell is high. Further, if the confidence value of the prediction of a given cell is lower than the first threshold value, then the system may mark such a cell with the GREEN label in the class probability map. Thus, for example, even if the GREEN cells in FIG. 5C may be determined by the AI model to contain a carbonate core feature that is of interest in creating the core description, since the corresponding confidence value of the prediction is determined to be lower than the threshold (e.g., 20%), the system marks the cell with the GREEN label.

At block 435, the system (e.g., gridding engine 209 of FIG. 2) may detect zero or more bounding boxes based on the current class probability map generated at block 430. For example, the gridding engine may determine that if the confidence value of a particular RED cell in the class probability map is higher than a second threshold value (e.g., 80% confidence), then the gridding engine may perform processing to identify (detect) and generate a bounding box corresponding to the detected feature of the RED cell with the high threshold value. This bounding box will be included in the final detection of features for the overall image input at block 405. For example, based on the confidence values of the corresponding RED cells in the class probability map of FIG. 5C being higher than the second threshold value (e.g., predetermined second threshold value), the gridding engine may perform processing to detect and generate the bounding boxes (e.g., first set of bounding boxes) shown in FIG. 5D that identify corresponding detected carbonate core features by placing a bounding box around each detected feature. For each of the bounding boxes detected at block 435 during the current run (epoch) with the current set grid cell size and shown in FIG. 5D, the gridding engine may determine five parameters: coordinates of the center point (x,y) of the bounding box relative to the input core image, Height and Width (h,w) of the bounding box, and Confidence value indicating the confidence that the bounding box includes the predicted carbonate core feature. These parameters may be used to index the detected feature to the right depth. For Example, if the core image starts at a depth of 3000 ft and ends at a depth of 3030 ft, then this processes will index the detected feature to the corresponding depth, in this case 3000.5 ft.

To generate the class probability map at block 430, the confidence value for each cell may be calculated by multiplying the product of the probability that the bounding box contains a feature Fr(Carbonate) and intersection over union (IOU):

$$\text{Confidence} = Fr(\text{carbonate}) \times \text{IOU}_{truth\text{-}pred}$$

$\text{IOU}_{truth\text{-}pred}$ denotes the intersection of the predicted box and the ground truth box, if no object found in the grid then Confidence=0 otherwise Confidence=$\text{IOU}_{truth\text{-}pred}$ $Fr(\text{Class}_i|\text{Object})$, where i=1, 2, . . . , C, where C represents conditional class probabilities predicted only once for each cell block. Therefore, each bounding box shares the same class probability map of FIG. 5C. This is done to prevent the same feature corresponding to the same bounding box from being detected twice. Object represents the feature that has been detected for the current bounding box, and $\text{Class}_i$ represents the different trained classes of the AI model Next, at block 440, the system (e.g., gridding engine 209) detects the grid cell size for the next run (or epoch) on the core image input at block 405, based the class probability map generated at block 430 and based on the current set grid cell size. At block 440, the gridding engine may dynamically specify the next grid cell size between the set minimum and maximum grid cell sizes for the next run (or epoch) of the input core image on the AI model to detect additional carbonate core features in the image. More specifically, the gridding engine at block 440 may determine what (larger) grid cell size the AI model should jump to from the current set (minimum) grid cell size based on detection of clusters of two or more adjacent grid cells in the class probability map generated at block 430. Any cluster of two or more adjacent or neighboring grid cells or blocks in the class probability map that are marked with the RED label, and that are predicted as belonging to the same carbonate core feature class may indicate the presence of a larger feature. Based on the detection of presence of such larger features in the input core image, the gridding engine may determine what grid cell size between the user defined minimum and maximum grid cell sizes, the system should jump to in order to perform additional runs or epochs on the input core image and detect additional carbonate core features. Thus, instead of iterating through the input image on multiple runs or epochs with fixed increments to the grid cell size, the system according to the present disclosure is configured to dynamically determine what the grid cell size for the next run or epoch should be so as to individually and granularly detect features (and separately detect multiple instances of the same feature) of different sizes during the different epochs on the input core image in a dynamic, scalable, and efficient manner.

For example, after the first run or epoch with the minimum sized cells (e.g., 224×224 pixels) of the input core image (e.g., steps 415-435 of the method) and corresponding detection of bounding boxes (step 435; e.g., bounding boxes shown in FIG. 5D), the gridding engine may determine at step 440, based on the size of the cluster(s) indicating larger carbonate core features in the generated class probability map, what the grid cell size for the next run or epoch of the core image should be. For example, as shown in FIG. 5E, based on the class probability map (FIG. 5C) generated for the current (first) run, the gridding engine may detect a cluster of four neighboring and adjacent cells (labeled "CLUSTER" in FIG. 5E) indicating a presence of a larger feature because each of the CLUSTER cells may be determined as belonging to the same carbonate core feature class and having corresponding confidence values higher than the first predetermined threshold. For example, the gridding engine may determine that the AI model has predicted each of the CLUSTER cells as belonging to the same carbonate core feature (e.g., "Fossil X") class with confidence values of "20%", "30%", "50%", and "60%", respectively. Based on the detection results for the CLUSTER cells, the gridding engine may apply predetermined logic to determine what (larger) grid cell size the system should jump to for the next run or epoch. That is, after the first run with the minimum grid cell size of 224×224 pixels, instead of simply incrementing the grid cell size by a fixed incremental value (e.g., 225×225 pixels), the gridding engine applies predetermined logic based on detection of cluster(s) in the class probability map to dynamically determine and jump to a next grid cell size (e.g., 400×400 pixels) for the next run or epoch. For example, the gridding engine may determine whether the center of a feature is within a width value to dynamically determine the larger grid cell size. That is, the gridding engine may determine whether the centroid of the bounding box is in the center of the detected feature.

The grid cell or block size determined by the gridding engine at block 440 may be set as the current grid block size by the separation engine at block 445, and the system may determine whether the maximum grid block size has been reached (block 450). If the system determines the maximum grid cell size has not been reached (NO at block 450), the processing of blocks 420-445 is repeated with the new larger grid cell or block size set at block 445. If, on the other hand, the system determines the maximum grid cell size has been reached (YES at block 450), the processing continues to block 455. Processing at blocks 420-445 will thus be repeated for each detected larger grid cell size until the set maximum grid cell size is reached, and as a result, the image will be processed multiple times through the AI network to (individually, separately, and granularly) detect different sized features in the image.

During the next run or epoch with the larger grid cell size (e.g., 400×400 pixels), method 400 will again proceed to block 420 where the separation engine will again separate the input core image (e.g., image at FIG. 5A) into cells based on the current (larger) grid cell size. For example, as shown in FIG. 5F, the system (e.g., separation engine 211 of AI network 205 of FIG. 2) will separate (e.g., segment or divide) the carbonate core image input at block 405 into a plurality of cells or blocks (e.g., second blocks) of equal size (e.g., second block size), where each cell or block has the current set grid cell size (e.g., 400×400 pixels). The system may then again input each separated grid cell from FIG. 5F into the trained and deployed AI model to predict a corresponding carbonate core feature, and a corresponding probability value, one block at a time (block 425). At block 430, the system may again generate a class probability map for the input core image based on the carbonate core features predicted for each of the grid cells for the current epoch with the larger grid cell size of FIG. 5F. At block 435, the system (e.g., gridding engine 209 of FIG. 2) may again detect zero or more bounding boxes based on the current class probability map generated at block 430. For example, based on the confidence value of the corresponding RED cell in the class probability map corresponding to FIG. 5F being higher than the second threshold value (e.g., 80% confidence), the gridding engine may perform processing to detect and generate the bounding box (e.g., second set of bounding boxes) shown in FIG. 5G that identifies the corresponding detected carbonate core feature (e.g., "Fossil X" feature corresponding to the cluster of FIG. 5E) by placing a bounding box around the feature. This bounding box will be included in the final detection of features for the core image input at block 405. The same process as described above in connection with the bounding boxes shown in FIG. 5D is repeated to generate the additional new bounding box shown in FIG. 5G.

Next, at block 440, the system (e.g., gridding engine 209) may again detect the grid cell size for the next (third and subsequent) run (or epoch) on the core image input at block 405, based the current most recent generated class probability map, and based on detection of any new clusters of two or more adjacent grid cells in the class probability map corresponding to FIG. 5F indicating presence of even larger features in the core input image. The processing of steps 420-445 is thus repeated for subsequent epochs of the input core image through the AI model and network, and with different dynamically identified grid cell sizes (between the set min and max grid cell sizes) to individually detect a plurality of bounding boxes corresponding to different carbonate core features having different sizes. This process may be repeated and the input core image is run through the network multiple times until the maximum grid cell size is reached at block 450. The gridding engine thus acts as a dynamic loop that finds the best size inputs to the AI model with highest mean value for prediction.

Method 400 then proceeds to block 455, where the system combines the different bounding boxes corresponding to the different runs or epochs of the input image through the AI model and counts the detected features. The final result of the multiple runs or epochs will be detection of all of the bounding boxes of different sizes from the different runs as shown in FIG. 5H. Each bounding box of FIG. 5H represents one detected carbonate core feature (and one corresponding class of the AI model) detected in the input image. Of course, two (or more) different bounding boxes of FIG. 5H may detect the same carbonate feature (i.e., may be determined to belong to the same class). Although, they represent different instances of the same carbonate feature. As mentioned previously, the system includes logic to prevent the same instance of the same carbonate core feature (corresponding to a particular one of the bounding boxes) from being detected more than once. Thus, with method 400, each unique instance of each carbonate core feature is individually and granularly detected in the input image, and processing performed by method 400 also ensures that the same instance of the same carbonate core feature is not detected more than once.

At block 455, the system (e.g., counting module 213) may further perform a counting operation to count or measure the combined features corresponding to the detected bounding boxes. For example, the system may count the number of occurrences or instances (e.g., one or more instances) of each type of carbonate core feature detected in the input core image. For example, if the system detects 10 instances of a first carbonate core feature (e.g., 10 instances of the "stromatoporoid" feature in the input image, each feature detected individually from the core image during the one or more runs or epochs based on the dynamic grid size set by the gridding engine), and further detects one instance of each of a second and a third carbonate core feature (e.g., one instance of each of the "grain stone" feature and the "stylolite" feature) in the input image, then the counting module at block 455 may count the features as detected in the bounding boxes as the number of instances of the "stromatoporoid" feature in the input image=10, the number of instances of the "grain stone" feature in the input image=1, and the number of instances of the "stylolite" feature in the input image=1, and output the count operation result.

The result output at block 455 may be a numerical result or output (e.g., class or label numbers) that identifies by numerical values the one or more different carbonate core features detected in the input core image by the AI model (e.g., shown in FIG. 5D or 5H), and also identifies by numerical values the number of instances of each of the detected one or more different carbonate core features. The counting operation is a measurement of occurrence of a given label or feature in the input core image. The counting operation ensures that transitioning from a sedimentological facies/sequence to the next sedimentological facies/sequence is captured in the final output core description data.

At block 465, the system (e.g., fine tuning model 215 of FIG. 2) may (optionally) perform processing to fine tune the detection and counting operation results output at block 455 to boost prediction accuracy. For example, the result extracted from the core image in numerical format at block 455 may be input to the fine tuning model that has been trained to improve prediction accuracy. As explained previously, the fine tuning model may take numerical detection and counting operation results of the AI network as input and fine tune the predictions to improve detection accuracy. The fine tuning model may be trained using the known core image data whose carbonate core features have already been identified and counted. Core image data used for training the fine tuning model may represent and include therein a plurality of carbonate core features. That is, the known core image data used for training the fine tuning model may correspond to core image data whose the core has already been described. The fine tuning model at block 465 may take as input the output from the AI network in number format and predict a numerical format output with improved prediction accuracy (e.g., prediction accuracy improved by 3-7%).

Next at block 470, the system (e.g., core description text generation engine 225 of FIG. 2) may generate and join core description text based on the numerical output of the fine tuning model at block 465, or alternately, based on the numerical output of the AI network at block 455. As explained previously, the system may include a core description text dictionary (e.g., dictionary module) in which respective numerical outputs (e.g., numbers representing the predicted core features or labels or classes, and the count of each feature or label) of the fine tuning model (or of the AI network) are keyed to core description text to replace the feature numbers and corresponding counts with text (e.g., words or phrases). That is, core description text dictionary may be a dictionary of words or phrases that are related to numbers. The system may further include joining module that is configured to join the various text labels output from the dictionary module to create the final core description text. That is, text identified using the dictionary may be joined together after replacement of the numbers to generate the core description. At block 470, based on the predicted classes (or core features) and the count of each class or feature in the input image, the system (e.g., dictionary module 227, and joining module 229 of FIG. 2) outputs a text core description corresponding to the core image in natural language form.

For example, if the system detects 10 instances of a first carbonate core feature (e.g., 10 instances of the "stromatoporoid" feature in the input image), and further detects one instance of each of a second and a third carbonate core feature (e.g., one instance of each of the "grain stone" feature and the "stylolite" feature) in the input image, the system (e.g., dictionary module 227, and joining module 229 of FIG. 2) may process the numerical output corresponding to the first, second, and third carbonate core features, and the count thereof to output a text core description at block 470 in natural language form such as "Stromatoporoid-dominated grain stone with stylolite". As another example, if the system detects 3 instances of a first carbonate core feature (e.g., 3 instances of the "stromatoporoid" feature in the input image), and further detects one instance of each of a second and a third carbonate core feature (e.g., one instance of each of the "grain stone" feature and the "stylolite" feature) in the input image, the system (e.g., dictionary module 227, and joining module 229 of FIG. 2) may process the numerical output corresponding to the first, second, and third carbonate core features, and the count thereof to output a text core description at block 470 in natural language form such as "Stromatoporoid grain stone with stylolite" (i.e., text description omits the word "dominated" based on corresponding keyed entry in dictionary module 227). Finally, at block 475, the system may output the core description data generated at block 470 as the automatically generated core description corresponding to the core image input at block 405. Method 400 may be repeated for each new core image input at block 405.

Figure 6:
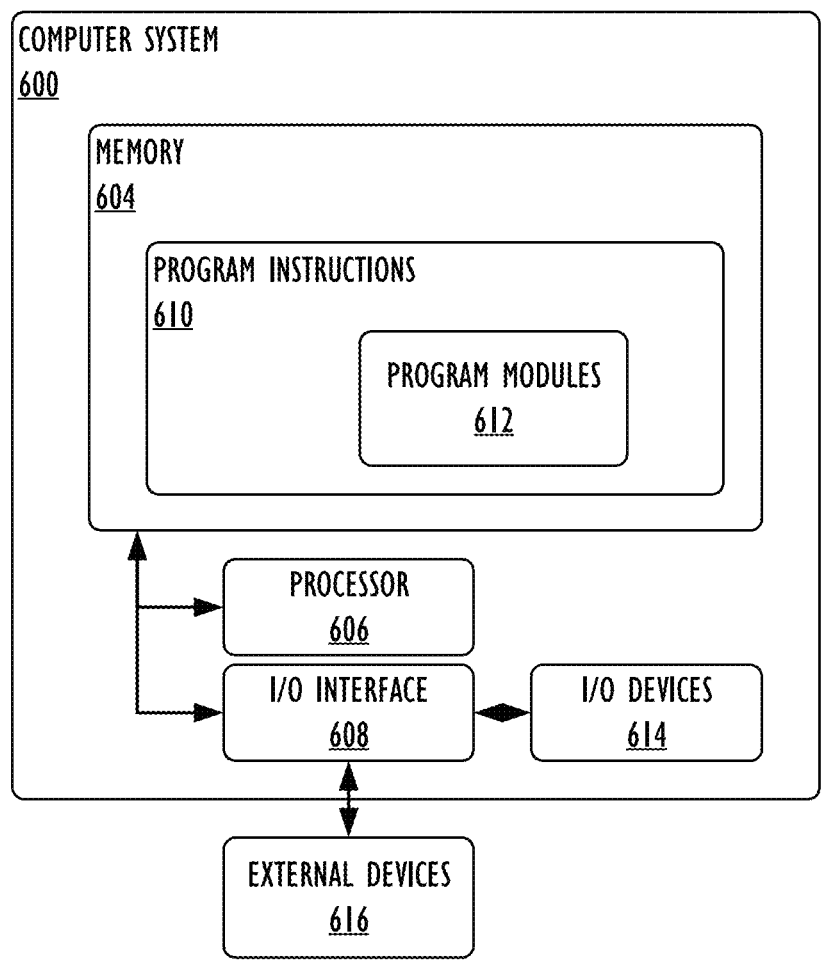
FIG. 6 is a functional block diagram of an exemplary computer system in accordance with one or more embodiments.

FIG. 6 is a functional block diagram of an exemplary computer system (or "system") 600 in accordance with one or more embodiments. In some embodiments, system 600 is a programmable logic controller (PLC). System 600 may include memory 604, processor 606 and input/output (I/O) interface 608. Memory 604 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). Memory 604 may include a non-transitory computer-readable storage medium (e.g., non-transitory program storage device) having program instructions 610 stored thereon. Program instructions 610 may include program modules 612 that are executable by a computer processor (e.g., processor 606) to cause the functional operations described, such as those described with regard to control system 110, system 200, method 300, or method 400.

Processor 606 may be any suitable processor capable of executing program instructions. Processor 606 may include a central processing unit (CPU) that carries out program instructions (e.g., the program instructions of the program modules 612) to perform the arithmetical, logical, or input/output operations described. Processor 606 may include one or more processors. I/O interface 608 may provide an interface for communication with one or more I/O devices 614, such as a joystick, a computer mouse, a keyboard, or a display screen (for example, an electronic display for displaying a graphical user interface (GUI)). I/O devices 614 may include one or more of the user input devices. I/O devices 614 may be connected to I/O interface 608 by way of a wired connection (e.g., an Industrial Ethernet connection) or a wireless connection (e.g., a Wi-Fi connection). I/O interface 608 may provide an interface for communication with one or more external devices 616. In some embodiments, I/O interface 608 includes one or both of an antenna and a transceiver. In some embodiments, external devices 616 include logging tools, lab test systems, well pressure sensors, well flowrate sensors, or other sensors described in connection with control system 110.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" (or its variants) means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the subject matter of the present disclosure therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for detection of carbonate core features from core images, comprising:
    collecting a variety of feature images corresponding to a variety of carbonate core features to define training sets of sample feature images;
    calculating a mean value of image for each of the training sets corresponding to each of the plurality of carbonate core features;
    training an artificial intelligence (AI) model to predict features and automatically create the carbonate core description based on images cropped randomly from the variety of carbonate core features;
    separating an input carbonate core image into a plurality of first blocks, each of the plurality of first blocks having a carbonate core feature and a first block size;
    inputting an image of each of the separated plurality of first blocks into artificial intelligence (AI) model;
    subtracting a mean value of an image in each of the plurality of first blocks from the mean value of image calculated for each of the training sets to obtain subtracted values; and
    generating the carbonate core description for the input carbonate core image based on the mean value of image calculated for each of the training sets that yields the lowest subtracted value.

2. The method according to claim 1, further comprising:
    training the AI model to predict for each of the first blocks one of a plurality of carbonate core features and a corresponding confidence value indicating a confidence of the predicted carbonate core feature being imaged in the first block;
    detecting any bounding boxes of a first set of bounding boxes in the input core image based on the predicted one of the plurality of carbonate core features and the corresponding confidence values for each of the first blocks;
    detecting a second block size, and separating the input carbonate core image into a plurality of second blocks, each of the plurality of second blocks having a second block size, wherein the second block size is dynamically detected based on the prediction by the AI model for each of the plurality of first blocks having the first block size;
    inputting an image of each of the separated plurality of second blocks into the AI model, the AI model being trained to predict for each of the second blocks, one of the plurality of carbonate core features and a corresponding confidence value indicating a confidence of the predicted carbonate core feature being imaged in the second block;
    detecting any bounding boxes of a second set of bounding boxes in the input core image based on the predicted one of the plurality of carbonate core features and the corresponding confidence values for each of the second blocks;
    combining the detected bounding boxes of the first and second sets in the input core image;
    counting a number of instances of each of the plurality of carbonate core features in the input carbonate core image based on the combined bounding boxes of the first and second sets; and
    generating the carbonate core description for the input carbonate core image based on the counted number of instances of each of the plurality of carbonate core features.

3. The method according to claim 2, wherein the second block size is larger than the first block size, and not larger than a third block size and wherein the first and third block sizes are set based on user input, and respectively correspond to a minimum grid block size and a maximum grid block size corresponding to the input carbonate core image.

4. The method according to claim 3, further comprising using a gridding engine to determine coordinates of the bounding box center point, bounding box dimensions, and a confidence value indicating the confidence that the bounding box includes the predicted carbonate core feature, and indexing a location of a one of the carbonate core features to a depth in a wellbore.

5. The method according to claim 2, wherein the second block size is detected further based on detection of a cluster of two or more neighboring first blocks, each of which is predicted by the AI model as imaging the same one of the plurality of carbonate core features, and has a corresponding confidence value that is higher than a predetermined first threshold value.

6. The method according to claim 2, further comprising:
    inputting into a fine tuning model, a result of the counting of the number of instances of each of the plurality of carbonate core features in the input carbonate core image, wherein the fine tuning model fine-tunes the result to improve prediction accuracy; and
    wherein the carbonate core description for the input carbonate core image is generated based on the fine-tuned result.

7. The method according to claim 6, wherein the fine tuning model is one of a trained support vector machine model, a boosted trees model, and a k-nearest neighbors model.

8. The method according to claim 2, wherein a result of the counted number of instances of each of the plurality of carbonate core features in the input core image is a numerical format result, and wherein generating the carbonate core description for the input carbonate core image comprises:
    replacing numbers included in the numerical format result with corresponding core description text based on a core description text dictionary; and
    joining the core description text corresponding to the replaced numbers to generate the carbonate core description for the input carbonate core image.

9. The method according to claim 1, wherein the AI model is a depth convolutional neural network that includes 24 layers including convolutional layers and dual connected layers, and wherein the AI model is a combination of the following network architectures, alexnet, resnet, densnet, and vgg19.

10. The method according to claim 1, wherein the plurality of carbonate core features that the AI model is trained to predict include carbonate core features corresponding to different grain sizes, different sedimentological features, different fossils, different rock textures, different structural features, different bedding planes, and different types of stone.

11. The method according to claim 1, wherein a bounding box of the first set of bounding boxes is detected in the input core image in response to determining that a corresponding first block is detected by the AI model as imaging a carbonate core feature that is of interest and that the corresponding confidence value is higher than a predetermined second threshold value.

12. A system for detection of carbonate core features from core images, the system comprising:
    memory storing an artificial intelligence (AI) model; and
    one or more processors operatively coupled to the memory, the one or more processors being configured to:
        receive a variety of feature images corresponding to a variety of carbonate core features to define training sets of sample feature images;
        calculate a mean value of image for each of the training sets corresponding to each of the plurality of carbonate core features;
        train an artificial intelligence (AI) model to predict features and automatically create the carbonate core description based on images cropped randomly from the variety of carbonate core features;
        separate an input carbonate core image into a plurality of first blocks, each of the plurality of first blocks having a carbonate core feature and a first block size;
        input an image of each of the separated plurality of first blocks into the AI model;
        subtract a mean value of an image in each of the plurality of first blocks from the mean value of image calculated for each of the training sets to obtain subtracted values; and
        generate the carbonate core description for the input carbonate core image based on the mean value of image calculated for each of the training sets that yields the lowest subtracted value.

13. The system according to claim 12, wherein the one or more processors are further configured to:
    detect a second block size, and separating the input carbonate core image into a plurality of second blocks, each of the plurality of second blocks having a second block size, wherein the second block size is dynamically detected based on the prediction of the AI model for each of the plurality of first blocks having the first block size;
    input an image of each of the separated plurality of second blocks into the AI model, the AI model being trained to predict for each of the second blocks, one of the plurality of carbonate core features and a corresponding confidence value indicating a confidence of the predicted carbonate core feature being imaged in the second block;
    detect any bounding boxes of a second set of bounding boxes in the input core image based on the predicted one of the plurality of carbonate core features and the corresponding confidence values for each of the second blocks;
    combine the detected bounding boxes of the first and second sets in the input core image;
    count a number of instances of each of the plurality of carbonate core features in the input carbonate core image based on the combined bounding boxes of the first and second sets; and
    generate a carbonate core description for the input carbonate core image based on the counted number of instances of each of the plurality of carbonate core features.

14. The system according to claim 13, wherein the second block size is larger than the first block size, and not larger than a third block size, wherein the first and third block sizes are set based on user input, and respectively correspond to a minimum grid block size and a maximum grid block size corresponding to the input carbonate core image.

15. The system according to claim 13, wherein the second block size is detected further based on detection of a cluster of two or more neighboring first blocks, each of which is predicted by the AI model as imaging the same one of the plurality of carbonate core features, and has a corresponding confidence value that is higher than a predetermined first threshold value.

16. The system according to claim 13, wherein the one or more processors are further configured to:
    input into a support vector machine model, a result of the counting of the number of instances of each of the plurality of carbonate core features in the input carbonate core image, wherein the support vector machine model is trained to fine-tune the result to improve prediction accuracy; and
    wherein the carbonate core description for the input carbonate core image is generated based on the fine-tuned result.

17. The system according to claim 12, wherein the AI model is a depth convolutional neural network, and wherein the plurality of carbonate core features that the AI model is trained to predict include carbonate core features corresponding to different grain sizes, different sedimentological features, different fossils, different rock textures, different structural features, different bedding planes, and different types of stone.

18. A non-transitory program storage device, readable by one or more programmable control devices and comprising instructions stored thereon to cause the one or more programmable control devices to:
    separate an input carbonate core image into a plurality of first blocks, each of the plurality of first blocks having a first block size;
    input an image of each of the separated plurality of first blocks into an artificial intelligence (AI) model, the AI model being trained to predict for each of the first blocks, one of a plurality of carbonate core features and a corresponding confidence value indicating a confidence of the predicted carbonate core feature being imaged in the first block;
    detect any bounding boxes of a first set of bounding boxes in the input core image based on the predicted one of the plurality of carbonate core features and the corresponding confidence values for each of the first blocks;
    receive a variety of feature images corresponding to a variety of carbonate core features to define training sets of sample feature images;
    calculate a mean value of image for each of the training sets corresponding to each of the plurality of carbonate core features;

train an artificial intelligence (AI) model to predict features and automatically create the carbonate core description based on images cropped randomly from the variety of carbonate core features;

separate an input carbonate core image into a plurality of first blocks, each of the plurality of first blocks having a carbonate core feature and a first block size;

input an image of each of the separated plurality of first blocks into the AI model;

subtract a mean value of an image in each of the plurality of first blocks from the mean value of image calculated for each of the training sets to obtain subtracted values; and generate the carbonate core description for the input carbonate core image based on the mean value of image calculated for each of the training sets that yields the lowest subtracted value.

19. The non-transitory program storage device according to claim 18, further comprising instructions stored thereon to cause the one or more programmable control devices to:

detect a second block size, and separating the input carbonate core image into a plurality of second blocks, each of the plurality of second blocks having a second block size, wherein the second block size is dynamically detected based on the prediction of the AI model for each of the plurality of first blocks having the first block size;

input an image of each of the separated plurality of second blocks into the AI model, the AI model being trained to predict for each of the second blocks, one of the plurality of carbonate core features and a corresponding confidence value indicating a confidence of the predicted carbonate core feature being imaged in the second block;

detect any bounding boxes of a second set of bounding boxes in the input core image based on the predicted one of the plurality of carbonate core features and the corresponding confidence values for each of the second blocks;

combine the detected bounding boxes of the first and second sets in the input core image;

count a number of instances of each of the plurality of carbonate core features in the input carbonate core image based on the combined bounding boxes of the first and second sets; and generate a carbonate core description for the input carbonate core image based on the counted number of instances of each of the plurality of carbonate core features.

20. The non-transitory program storage device according to claim 19, further comprising detect a second block size, and separating the input carbonate core image into a plurality of second blocks, each of the plurality of second blocks having a second block size, wherein the second block size is dynamically detected based on the prediction of the AI model for each of the plurality of first blocks having the first block size;

input an image of each of the separated plurality of second blocks into the AI model, the AI model being trained to predict for each of the second blocks, one of the plurality of carbonate core features and a corresponding confidence value indicating a confidence of the predicted carbonate core feature being imaged in the second block, detect any bounding boxes of a second set of bounding boxes in the input core image based on the predicted one of the plurality of carbonate core features and the corresponding confidence values for each of the second blocks;

combine the detected bounding boxes of the first and second sets in the input core image;

count a number of instances of each of the plurality of carbonate core features in the input carbonate core image based on the combined bounding boxes of the first and second sets; and generate a carbonate core description for the input carbonate core image based on the counted number of instances of each of the plurality of carbonate core features, and wherein the second block size is larger than the first block size, and not larger than a third block size, and wherein first and third block sizes are set based on user input, and respectively correspond to a minimum grid block size and a maximum grid block size.

* * * * *